(12) United States Patent
Haas et al.

(10) Patent No.: US 10,677,097 B2
(45) Date of Patent: Jun. 9, 2020

(54) TURBOCHARGER

(71) Applicant: MAN ENERGY SOLUTIONS SE, Augsburg (DE)

(72) Inventors: Bernd Haas, Neusäß (DE); Stefan Rost, Augsburg (DE); Stefan Weihard, München (DE)

(73) Assignee: MAN Energy Solutions SE, Augsburg (DE)

( * ) Notice: Subject to any disclaimer, the term of this patent is extended or adjusted under 35 U.S.C. 154(b) by 96 days.

(21) Appl. No.: 16/125,037

(22) Filed: Sep. 7, 2018

(65) Prior Publication Data
US 2019/0078468 A1    Mar. 14, 2019

(30) Foreign Application Priority Data

Sep. 14, 2017   (DE) .................. 10 2017 121 316

(51) Int. Cl.
| | |
|---|---|
| *F01D 25/24* | (2006.01) |
| *F01D 25/18* | (2006.01) |
| *F16J 15/447* | (2006.01) |
| *F02B 39/14* | (2006.01) |
| *F01D 11/02* | (2006.01) |
| *F01D 25/16* | (2006.01) |

(Continued)

(52) U.S. Cl.
CPC .......... *F01D 25/243* (2013.01); *F01D 11/025* (2013.01); *F01D 25/16* (2013.01); *F01D 25/183* (2013.01); *F01D 25/24* (2013.01); *F02B 39/14* (2013.01); *F02C 6/12* (2013.01); *F16J 15/4476* (2013.01); *F02B 37/00* (2013.01); *F05D 2220/40* (2013.01); *F05D 2230/642* (2013.01); *F05D 2240/55* (2013.01); *F05D 2260/36* (2013.01)

(58) Field of Classification Search
None
See application file for complete search history.

(56) References Cited

U.S. PATENT DOCUMENTS

| | | | | |
|---|---|---|---|---|
| 4,447,062 | A * | 5/1984 | Leicht .................. | F01D 11/003 277/347 |
| 4,664,605 | A * | 5/1987 | Asano .................. | F01D 25/183 417/407 |
| 9,353,637 | B2 * | 5/2016 | Gerard .................. | F01D 11/00 |

(Continued)

FOREIGN PATENT DOCUMENTS

| | | | |
|---|---|---|---|
| CN | 204646413 U | * | 9/2015 |
| CN | 206386155 U | * | 8/2017 |
| CN | 207363716 U | * | 5/2018 |

*Primary Examiner* — Michael Lebentritt
(74) *Attorney, Agent, or Firm* — Cozen O'Connor

(57) ABSTRACT

A turbocharger, includes a turbine for expanding a first medium, the turbine has a turbine housing and a turbine rotor, a compressor for compressing a second medium, having a compressor housing and a compressor rotor that is coupled to the turbine rotor via a shaft. The turbine housing and the compressor housing are each connected to a bearing housing arranged between them, in which the shaft is mounted. In a connecting region between an inflow housing of the turbine housing and the bearing housing a sealing cover is arranged. On a radially inner section of the sealing cover a projection extending in the axial direction is formed, which engages into a groove introduced into the bearing housing forming a radially inner fit and a radially outer fit.

8 Claims, 2 Drawing Sheets

(51) Int. Cl.
*F02C 6/12* (2006.01)
*F02B 37/00* (2006.01)

(56) References Cited

U.S. PATENT DOCUMENTS

| | | | | |
|---|---|---|---|---|
| 10,508,564 | B2* | 12/2019 | Haslinger | F01D 25/168 |
| 2002/0158418 | A1* | 10/2002 | Thiesemann | F01D 25/18 |
| | | | | 277/423 |
| 2003/0150211 | A1* | 8/2003 | Fledersbacher | F01D 17/165 |
| | | | | 60/602 |
| 2005/0268610 | A1* | 12/2005 | Daudel | F01D 17/165 |
| | | | | 60/602 |
| 2014/0234075 | A1* | 8/2014 | Weber | F01D 25/186 |
| | | | | 415/112 |
| 2014/0241858 | A1* | 8/2014 | Tashiro | F01D 11/005 |
| | | | | 415/111 |
| 2015/0056067 | A1* | 2/2015 | Segawa | F01D 11/005 |
| | | | | 415/167 |
| 2015/0361992 | A1* | 12/2015 | Tezuka | F04D 29/056 |
| | | | | 415/213.1 |
| 2016/0090904 | A1* | 3/2016 | Lee | F02B 37/24 |
| | | | | 415/115 |
| 2016/0281593 | A1* | 9/2016 | Segawa | F01D 17/165 |
| 2017/0114714 | A1* | 4/2017 | Niwa | F04D 29/162 |
| 2018/0087531 | A1* | 3/2018 | Weisbrod | F01D 25/243 |
| 2018/0238191 | A1* | 8/2018 | Haslinger | F16C 35/042 |
| 2018/0252229 | A1* | 9/2018 | Isogai | F04D 29/083 |
| 2019/0301481 | A1* | 10/2019 | Colont | F16C 19/06 |

* cited by examiner

TURBOCHARGER

BACKGROUND OF THE INVENTION

1. Field of the Invention

The invention relates to a turbocharger.

2. Description of the Related Art

The fundamental construction of a turbocharger is known to the person skilled in the art addressed here. A turbocharger comprises a turbine, in which a first medium is expanded. Furthermore, a turbocharger comprises a compressor, in which a second medium is compressed utilising energy extracted in the turbine during the expansion of the first medium. The turbine of the turbocharger comprises a turbine housing and a turbine rotor. The compressor of the turbocharger comprises a compressor housing and a compressor rotor. Between the turbine housing of the turbine and the compressor housing of the compressor a bearing housing is positioned. The bearing housing is connected on one side to the turbine housing and on the other side to the compressor housing. In the bearing housing, a shaft is mounted via which the turbine rotor is coupled to the compressor rotor.

From practice it is known that the turbine housing of the turbine, namely a so-called inflow housing, and the bearing housing are connected to one another via a fastening device that is preferentially designed as a clamping claw. Such a fastening device designed as a clamping claw is mounted, with a first section of the same, on a flange of the turbine housing via fasteners and with a second section overlaps a flange of the bearing housing at least partially. By way of such a fastening device the unit or combination of bearing housing and turbine housing is braced, namely clamping a radially outer section of a sealing cover and nozzle ring between turbine housing and bearing housing. From practice it is known that a radially inner section of the sealing cover forming a fit comes to lie against a corresponding projection of the bearing housing. Adjacent to this fit, a sealing air bore is preferentially introduced into the bearing housing, via which sealing air can be conducted in the direction of the shaft, preferentially in the direction of a track ring interacting with the shaft. The sealing air in this case serves for sealing between rotating and fixed components at the interface between bearing housing and shaft or between bearing housing and track ring in order to avoid an undesirable transfer of, for example, oil and/or combustion particles between the bearing housing and the turbine. Here, the sealing air is extracted on the compressor side and conducted via a flow duct and the sealing air bore in the direction of the shaft or the track ring.

During the operation, a gap enlargement can form between the radially inner section of the inner cover and the bearing housing, as a result of which a leakage flow of the sealing air is brought about. Because of this, the sealing air supply via the sealing air bore in the direction of the shaft or the track ring is restricted. This is disadvantageous.

SUMMARY OF THE INVENTION

One aspect of the present invention is creating a new type of turbocharger.

On a radially inner section of the sealing cover a protrusion extending in the axial direction is formed, which engages into a groove introduced into the bearing housing forming a radially inner fit and a radially outer fit.

Because of the fact that the protrusion formed on the radially inner section of the sealing cover and extending in the radial direction engages in the groove introduced into the bearing housing forming two fits that are spaced in the radial direction, a leakage flow of the sealing air can be reduced or even completely prevented. At low temperatures, the radially inner fit can assume the sealing action. When the clearance on the radially inner fit increases at higher temperatures during operation, the radially outer fit automatically closes and assumes the sealing function. Sealing air leakage can thus be effectively prevented.

Preferentially, a cold clearance in the region of the inner fit is smaller than in the region of the outer fit. In the region of the inner fit, an operating clearance is greater than in the region of the outer fit. This also serves to effectively prevent sealing air leakage.

Between an end face of the protrusion of the sealing cover and a groove bottom of the groove of the bearing housing, a first axial gap is formed. Between an end face of the sealing cover and an end face of the bearing housing a second axial gap is formed. The radial fits and the axial gaps form a labyrinth seal. An even more effective prevention of sealing air leakage is possible by way of this.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred further developments of the invention are obtained from the subclaims and the following description. Exemplary embodiments of the invention are explained in more detail by way of the drawing without being restricted to this. There it shows:

DETAILED DESCRIPTION OF THE PRESENTLY PREFERRED EMBODIMENTS

The invention relates to a turbocharger.

Figure 1:
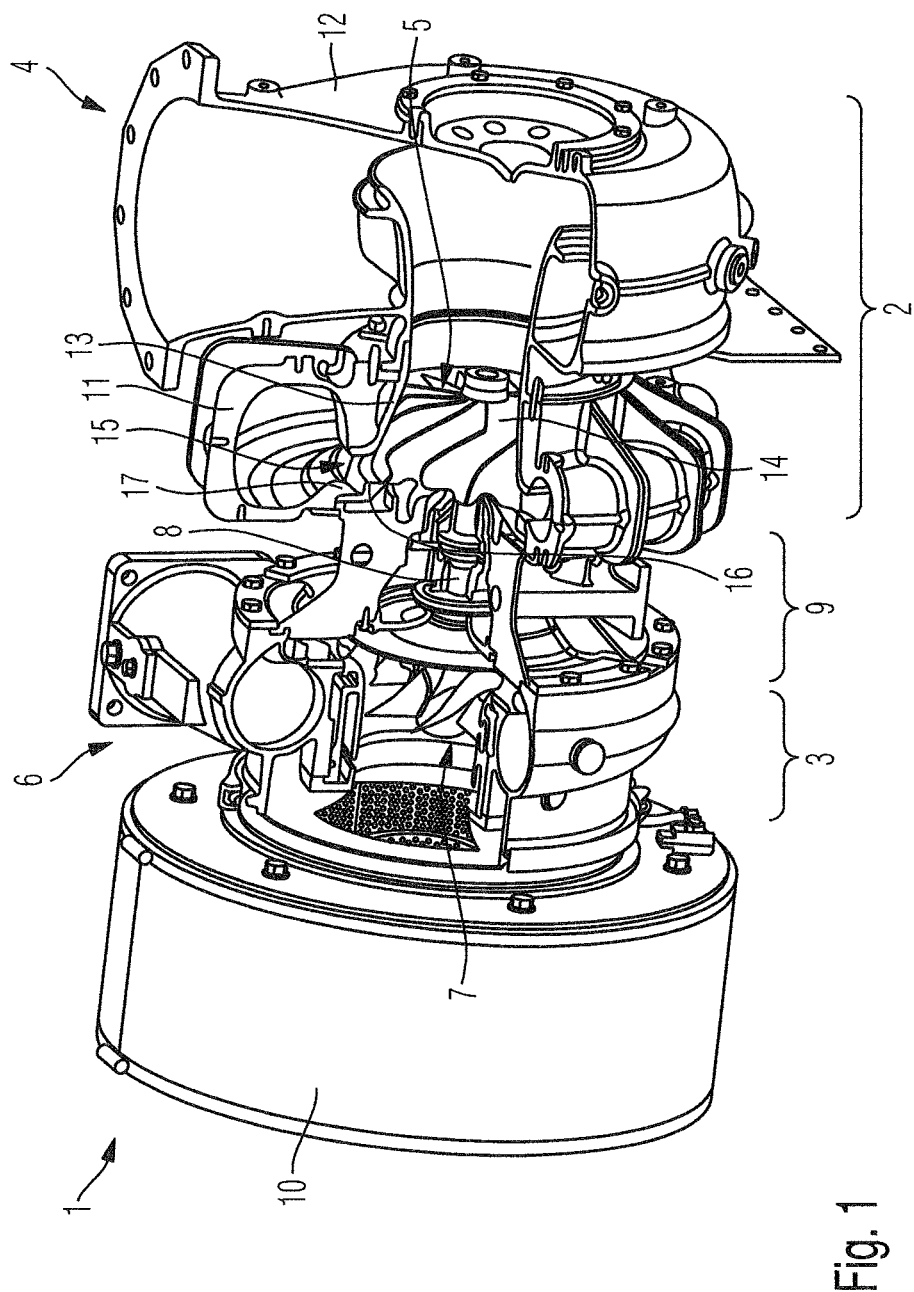
FIG. 1 is a cross section through a turbocharger.

FIG. 1 shows the fundamental construction of a turbocharger 1. A turbocharger 1 comprises a turbine 2 for expanding a first medium, in particular for expanding exhaust gas of an internal combustion engine. Furthermore, a turbocharger 1 comprises a compressor 3 for compressing a second medium, in particular charge air, utilizing energy extracted in the turbine 2 during the expansion of the first medium.

Here, the turbine 2 comprises a turbine housing 4 and a turbine rotor 5. The compressor 3 comprises a compressor housing 6 and a compressor rotor 7. The compressor rotor 7 is coupled to the turbine rotor 5 via a shaft 8 mounted in a bearing housing 9. The bearing housing 9 is positioned between the turbine housing 4 and the compressor housing 5 and connected to both the turbine housing 4 and the compressor housing 5.

The turbine housing 4 of the turbine 2 comprises an inflow housing 11 and an outflow housing 12. By way of the inflow housing 11, the first medium to be expanded in the region of the turbine 2 can be fed to the turbine rotor 5. By way of the outflow housing 12, first medium expanded in the region of the turbine rotor 5 flows away from the turbine.

In addition to the inflow housing 11 and the outflow housing 12, the turbine housing 4 comprises an insert piece 13, wherein the insert piece 13 extends in particular in the region of the inflow housing 11, namely adjacently to the turbine rotor 5 radially adjoining moving blades 14 of the turbine rotor 5 on the outside.

The turbine housing 4, furthermore, comprises a nozzle ring 15. The nozzle ring 15 is also described as a turbine guide apparatus.

Furthermore, FIG. 1 shows a sealing cover 16 in the connecting region of inflow housing 11 and bearing housing 9. The sealing cover 16 is also described as a bearing housing cover or heat shield.

The inflow housing 11 of the turbine 2 is connected to the bearing housing 9 via a fastening device 17, which is preferentially designed as a clamping claw. In this connecting region between bearing housing 9 and inflow housing 11 of the turbine, a radially outer section of the sealing cover 15 is clamped. Preferentially, the nozzle ring is also clamped in this connecting region with a section.

Figure 2:
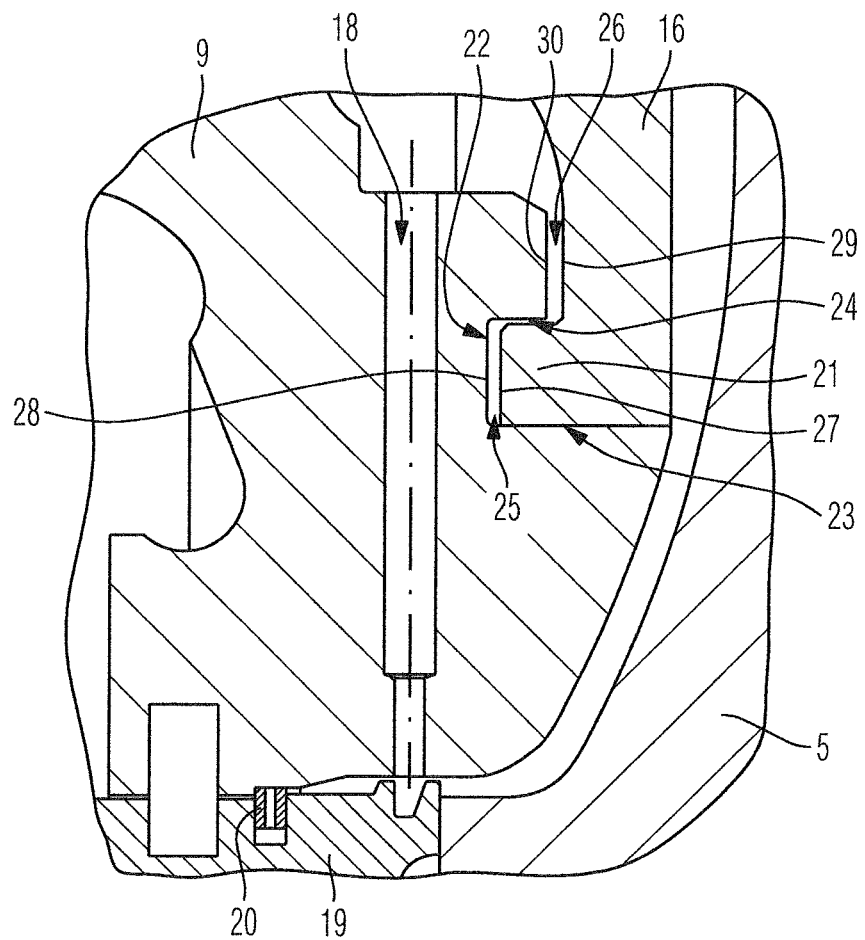
FIG. 2 is a detail of a turbocharger according to the invention.

FIG. 2 shows a portion of a turbocharger according to the invention in the connecting region between bearing housing 9 and turbine, namely in the region of a radially inner section of the bearing housing 9 and of the sealing cover 16 adjoining the turbine rotor 5. Here, FIG. 2 shows a sealing air bore 18 via which sealing air, which is extracted from the compressor 3 and conducted in the direction of the bearing housing 9, is conducted in the direction of a track ring 19, which acts on the bearing housing 9 via a locking element 20.

In terms of the present invention, a protrusion 21 extending in the axial direction is formed on the radially inner section of the sealing cover 16. This protrusion 21 on the radially inner section of the sealing cover 16 engages into a groove 22 introduced into the bearing housing 9, namely forming a radially inner fit 23 and a radially outer fit 24. In the region of the radially inner fit 23 a gap bank of the radially inner fit 23 on the bearing housing side is located further radially inside than a gap bank on the cover side. In the region of the radially outer fit 24 by contrast a gap bank on the bearing housing side of the radially outer fit 24 is located further radially outside than a gap bank on the cover side.

FIG. 2 shows the turbocharger in a cold state, wherein in the region of a radially inner fit 23 a cold clearance is smaller than in the region of the outer fit 24. In particular when during the operation assemblies of the turbocharger 1 are heated up, the sealing cover 16 is subjected to a greater thermal expansion than the bearing housing 9, so that the sealing cover 16 expands more. In the process, the operating clearance in the region of the radially inner fit 23 increases compared with the cold clearance. However, at the same time an operating clearance is formed in the region of the outer fit 24 that is smaller than the cold clearance of the inner fit 23. Thus, when at low temperatures the radially inner fit 23 assumes the sealing function, the radially outer fit 24 assumes the sealing function at higher operating temperatures.

From FIG. 2 it is evident that between an end face 27 of the projection 21, which faces a groove bottom 28 of the groove 22, and the groove bottom 28 of the groove 22 a first axial clearance 25 is formed. A second axial gap 26, which compared with this axial gap 25 is offset in the axial direction and radial direction, is formed between an end face 29 of the radially inner section of the sealing cover 16 and a correspondingly facing end face 30 of the bearing housing 9. Both these axial gaps 25, 26 form a labyrinth seal with the two radial fits 23, 24, as a result of which the sealing function for the sealing air in the region of the radially inner section of the sealing cover 16 can be further improved.

By forming the axial projection 21 on the radially inner end of the sealing cover 16, which engages in a corresponding groove 22 of the bearing housing 9, axial gaps 25 and 26 on the one hand and radial fits 23 and 24 on the other hand are accordingly provided. In the case of the radially inner fit 23 the cold clearance is smaller than with the radially outer fit 24. In the case of the radially outer fit the operating clearance is smaller than with the radially inner fit 23. Accordingly it can be ensured that different thermal deformations of sealing cover 16 and bearing housing 9 do not negatively affect the sealing function for the sealing air.

The design of the clearances in the region of the fits 23, 24 is effected so that a good sealing function for the sealing air is ensured throughout the operating range. Furthermore, mechanical overloading of the connection of groove and projection 21 is to be prevented. At low temperatures or when running up the turbocharger, the assemblies are subject to a low temperature-induced expansion, wherein the radially inner fit 23 then assumes the sealing function. At increasingly higher temperatures, the clearance in the region of the radially inner fit 23 increases but the clearance in the region of the outer fit 24 is reduced so that the radially outer fit 24 then assumes the sealing function.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:
1. A turbocharger, comprising:
a shaft;
a turbine for expanding a first medium, having:
  a turbine housing; and
  a turbine rotor;
a compressor for compressing a second medium utilising energy extracted in the turbine during expansion of the first medium, having:
  a compressor housing; and
  a compressor rotor that is coupled to the turbine rotor via the shaft;
a bearing housing arranged between and connected to the turbine housing and the compressor housing an in which the shaft is mounted;

a sealing cover arranged in a connecting region between an inflow housing of the turbine housing and the bearing housing; and a projection extending in an axial direction is formed on a radially inner section of the sealing cover, which engages into a groove introduced into the bearing housing forming a radially inner fit and a radially outer fit.

2. The turbocharger according to claim 1, wherein a first axial gap is formed between an end face of the projection of the sealing cover and a groove bottom of the groove of the bearing housing.

3. The turbocharger according to claim 2, wherein a second axial gap is formed between an end face of the sealing cover and an end face of the bearing housing.

4. The turbocharger according to claim 3, wherein the radial fits and the axial gaps form a labyrinth seal.

5. The turbocharger according to claim 1, wherein in a region of the inner fit a gap bank on a bearing housing side is located radially further inside than a gap bank on a cover side.

6. The turbocharger according to any one of the claim 1, wherein in a region of the outer fit a gap bank on a bearing housing side is located radially further outside than a gap bank on a cover side.

7. The turbocharger according to claim 1, wherein in a region of the inner fit a cold clearance is smaller than in a region of the outer fit.

8. The turbocharger according to claim 1, wherein in a region of the inner fit an operating clearance is greater than in a region of the outer fit.

* * * * *